July 5, 1932.   W. W. WILLIAMS   1,865,664
METHOD FOR MAKING MIXED OIL GAS AND PRODUCER GAS
Filed April 4, 1929   3 Sheets-Sheet 1

INVENTOR
W. W. WILLIAMS
BY
ATTORNEY

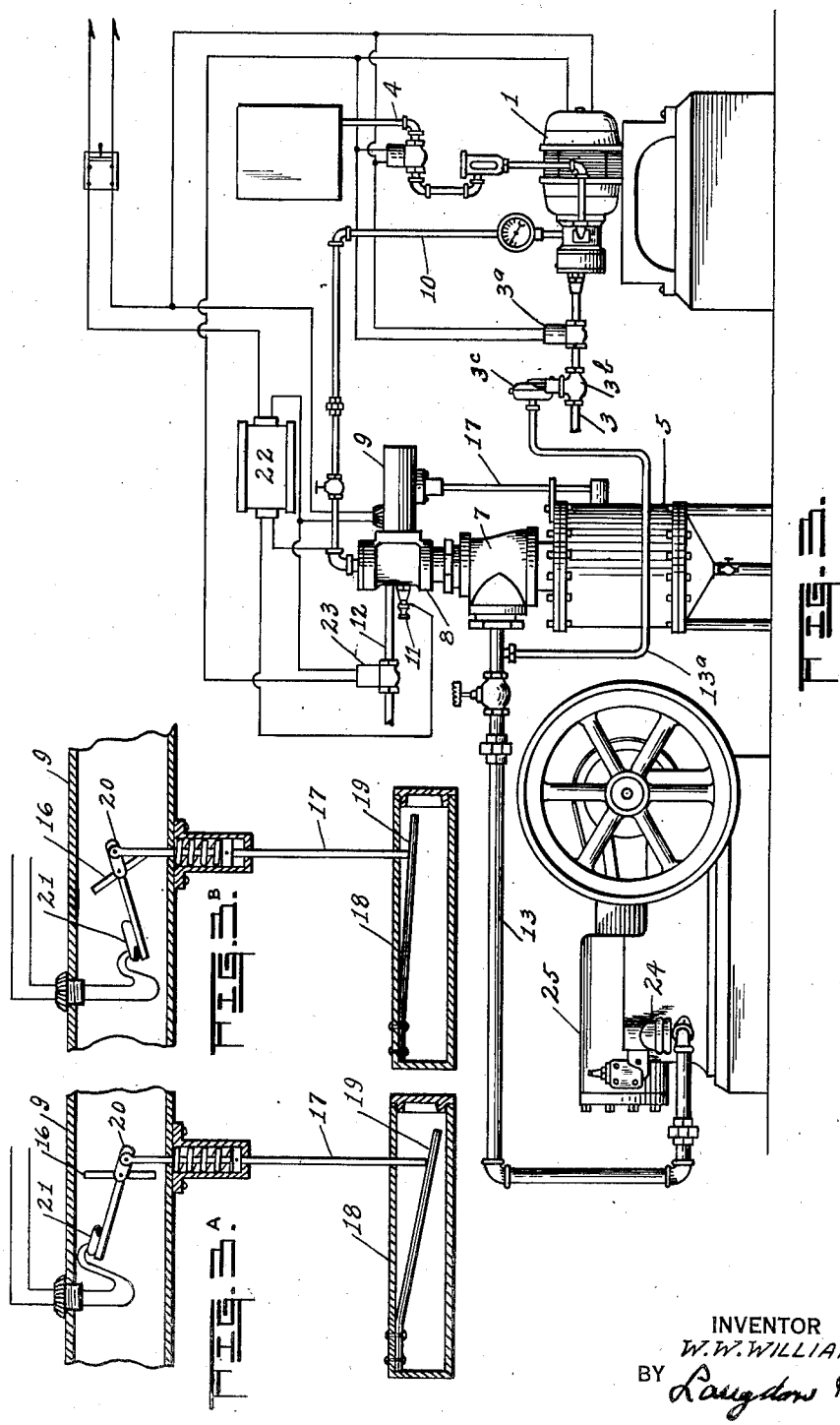

Patented July 5, 1932

1,865,664

UNITED STATES PATENT OFFICE

WALTER W. WILLIAMS, OF BLOOMINGTON, ILLINOIS, ASSIGNOR TO WILLIAMS OIL-O-MATIC HEATING CORPORATION, OF BLOOMINGTON, ILLINOIS, A CORPORATION OF ILLINOIS

METHOD FOR MAKING MIXED OIL GAS AND PRODUCER GAS

Application filed April 4, 1929. Serial No. 352,362.

This invention relates to improvements in the production of a gaseous fuel and more particularly to the production of the so-called producer gas from liquid fuel. This application is a continuation in part from the applicant's co-pending application Serial No. 162,715, filed January 22, 1927 which became Patent No. 1,795,814 on March 10, 1931.

The advantages of gaseous fuels for both domestic and industrial purposes have been long recognized and have been taken advantage of to a large degree in industrial heating furnaces. Gaseous fuels may be divided into four classes: natural gas, producer gas, water gas and coal gas. Natural gas and coal gas have long been employed for both domestic lighting and heating, while producer gas and water gas have been rarely used for these purposes. It is an object of this invention to provide a method and means for making and using a gaseous fuel of the producer gas type in connection with a domestic heating system which may also be used for industrial purposes. It has been found that producer gas is a very cheap and valuable fuel for metal heat-treating furnaces and produces a very uniform heat. It is possible for producer gas to raise the temperature of a furnace to a required degree more quickly than with any other form of fuel.

Producer gas has heretofore been made by forcing air through a bed of incandescent coal or coke in specially constructed furnaces called "gas producers". Such gas producers usually consist of a space enclosed by a refractory material and containing solid fuel such as coal, coke, or wood, at a high temperature, through which air and steam are caused to pass. The reaction between the air and steam and the fuel, which latter consists largely of carbon, causes the formation of hydrogen and carbon monoxide. These two combustible gases, mixed with the inert nitrogen introduced by the air form the gas known as "producer gas".

It is the main object of this invention to utilize liquid fuel, such as the heavier residues of petroleum such as "fuel oil" in place of the solid fuels heretofore used in the manufacture of producer gas. This improved apparatus briefly consists in means for heating to incandescence divided particles of refractory material contained within an enclosed refractory lined receptacle and passing through such incandescent particles liquid fuel in an atomized or vaporized condition which fuel, in passing through the incandescent refractory particles, becomes broken up in much the same manner as in a gas producer, and the carbon and other constituents of the liquid fuel are rearranged from their original physical and chemical state of combination resulting in a gas, which when mixed with air, will give approximately the same effect as the producer gas heretofore described. Steam may also be added to the atomized oil or liquid fuel passing through the incandescent particles of refractory material by admitting a small stream of water into the enclosed receptacle after the refractory particles therein have been heated to incandescence.

While the preferred forms of this invention are illustrated upon the accompanying sheets of drawings, yet, it is to be understood that minor detail changes may be made in the same without departing from the scope of this invention.

In the drawings, Figure 1 is a view in side elevation of a preferred embodiment of this invention, as applied to a domestic heating system, with parts broken away and the electric circuit illustrated in diagram.

Figure 3 is a view in side elevation of another embodiment of this invention, with the electric circuits illustrated in diagram.

Figure 3^A is an enlarged detail view in central vertical section, with parts broken away illustrating one position of the electric control apparatus employed in Figure 3.

Figure 3^B is a view similar to Figure 3^A illustrating another position of the control apparatus shown in Figure 3^A.

Figure 1:
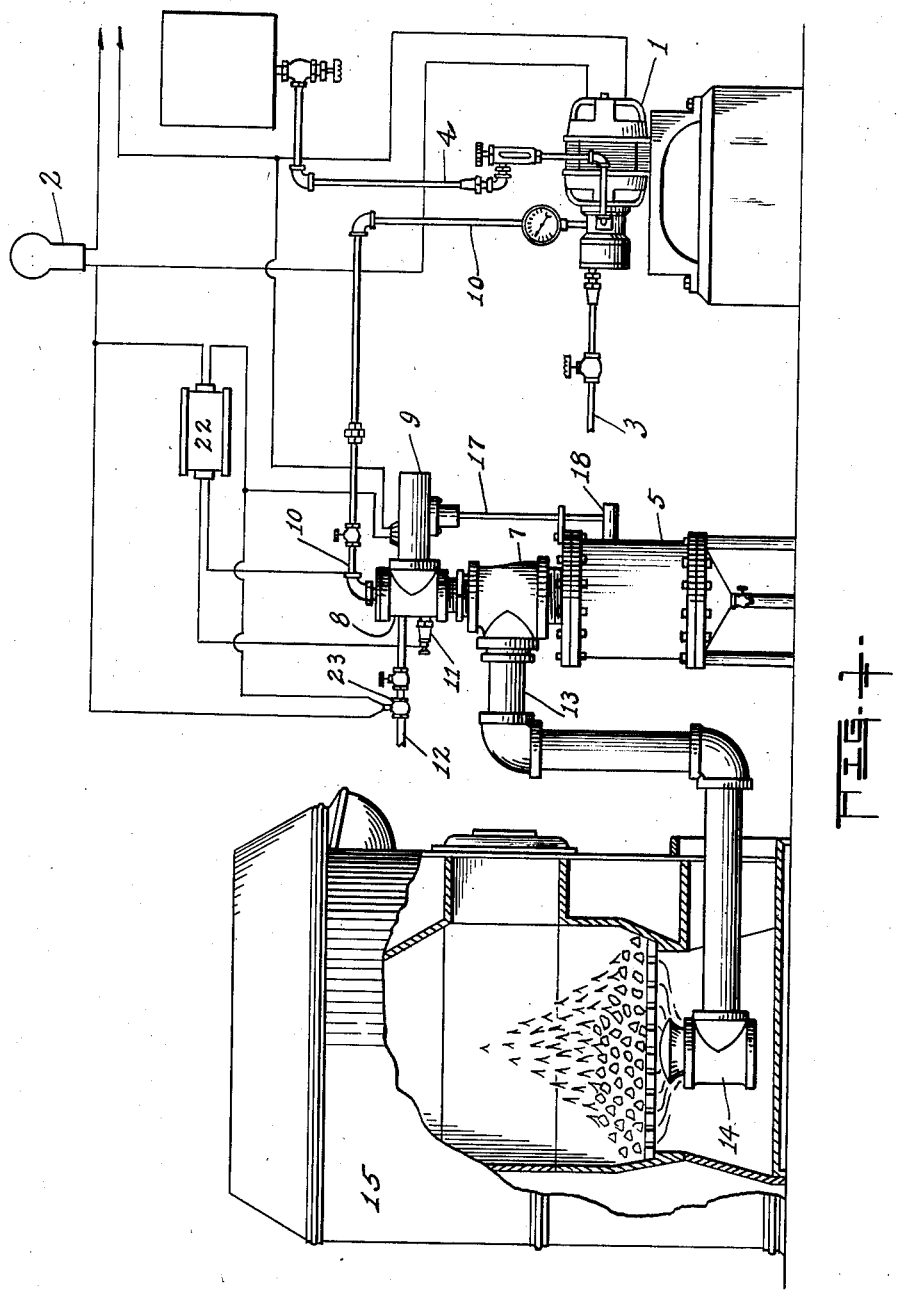
Figure 2:
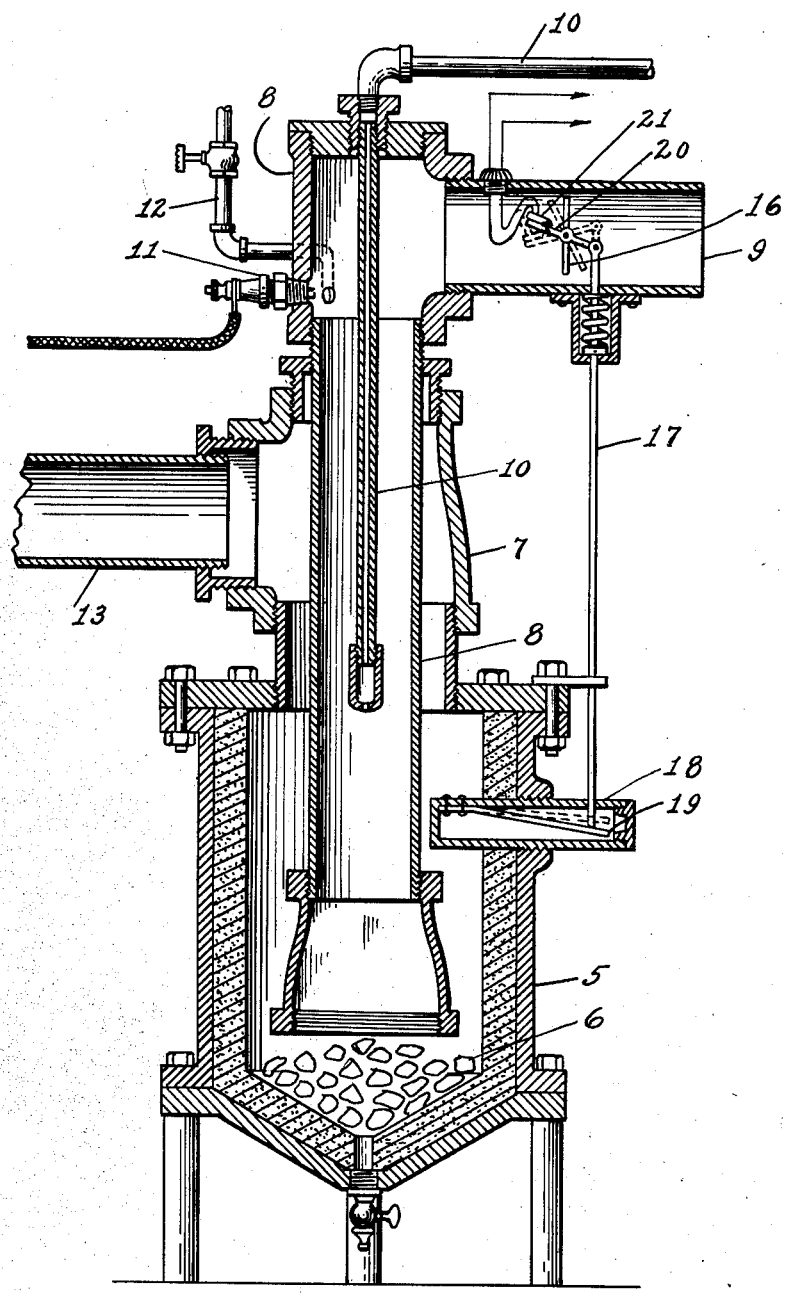
Figure 2 is a view in vertical central section taken through the gas producer apparatus illustrated in Figure 1.

A preferred embodiment of this invention is illustrated in Figures 1 and 2 of the drawings. This embodiment illustrates the application of this invention to one form of commercial domestic heating furnace. While this and other embodiments of this invention are illustrated in connection with a domestic heating furnace, it is to be understood that this invention can be employed in connection with heating furnaces of an industrial type without departing from the scope of the invention.

As seen in Figure 1, an electric motor 1 is connected through a commercial room thermostat 2 to the commercial line of a source of electricity. The driving shaft of this motor operates an atomizing pump and a metering pump of commercial form, shown and described in my prior Patent 1,451,798, dated April 17, 1923. Liquid fuel is supplied from a tank or other source, not shown, through a valve controlled pipe 3 to a metering pump which, during the operation of the motor, supplies liquid fuel at a constant rate to the atomizing pump. A predetermined amount of water is supplied by gravity through a pipe 4 from a tank above the motor to the atomizing pump where it is mixed with air and liquid fuel in an atomized condition.

A gas producing chamber 5 is illustrated in Figure 1 between the motor and domestic heating furnace. This gas producing chamber, as shown in Figure 2, comprises a metallic casing lined with refractory material. It is preferable to construct the bottom of this casing and lining in the form of an inverted cone with a drain cock in the apex thereof. Within the casing and refractory material a plurality of irregular shaped pieces of refractory material 6 are supported in the sloping walls of the conical bottom. Centrally supported upon the top of the gas producing casing, a gas conduit 7 is provided which supports centrally therewithin and in this gas producing casing an air and liquid fuel mixture conduit 8, which preferably terminates in an enlarged extremity adjacent the upper surface of the divided particles of refractory material. The upper end of this latter conduit 8 is provided with an angularly deposed intake chamber 9 opening to the atmosphere and is provided with a pipe 10 extending through the center of the upper closure and communicating with the atomizing pump, the inner end of which terminates in a nozzle approximately in line with the top of the gas producing casing. Preferably on the side of the air and mixture conduit 8, opposite the chamber opening to the atmosphere, an electric ignition device 11 is installed, which may be of any desired commercial form as long as it produces a spark within the conduit. Adjacent this ignition device a pilot light aperture is provided which communicates through a valve-controlled pipe 12 to an independent gas supply, such as a commercial illuminating gas line.

An aperture is provided on the side of the gas conduit casing 7 for the reception of a conduit 13 for conducting the fixed gas therefrom to a burner 14, which, as illustrated in Figure 1, is preferably located centrally under the grate bars in the commercial domestic heating furnace 15, illustrated. Particles of refractory material of irregular form and approximately the size of the solid fuel customarily employed in heaters of this type, are placed upon the upper side of the grate bars of the heater in the same manner as solid fuel.

When the electric motor is energized by the commercial current, the atomizing pump and metering pump will be operated to deliver liquid fuel in an atomized condition with which particles of water are intermixed through the pipe 10 leading from the atomizing pump to the nozzle within the air and mixture conduit 8 and will be delivered therefrom under pressure and in the form of a spray. The pilot light having been ignited at the time the motor is energized, this atomized spray mixture rising in the mixture conduit will become ignited and the flame will pass downward through the air and mixture conduit drawing air through the upper intake chamber opening to the atmosphere along with it so that the ignited mixture and air will pass downward and be discharged from its surrounding conduit upon the particles of refractory material 6 supported upon the bottom of the gas producer casing. These particles will be rapidly heated and become incandescent and if these particles are irregular in form, the liquid fuel mixture and air will pass through the interstices thereof and be deflected upward against the refractory lining of the gas producer casing and thence pass into the gas conduit casing 7 and from there through the fixed gas conduit 13 to the burner where the gas will mix with the surrounding air and pass upward through the particles of refractory material supported upon the grate bars and when ignited will burn in the same manner as producer gas.

It is preferable that certain electric controls be employed in the operation of this device, particularly so when installed as a part of the heating system of a dwelling. As illustrated in Figure 1, the motor is connected in circuit through a room thermostat 2 with the source of commercial electricity. A commercial thermostat of this type may be set to close the circuit when the temperature of the room in which it is placed descends to a certain degree and when the temperature of this room is increased to a certain degree, the thermostat will operate to break the circuit to the motor. It is also preferable to place in circuit between the thermostat and motor an ignition device and an electrically operated and controlled valve in the pipe leading from the pilot light to the independent source of gas supply.

As illustrated in Figure 1, the room thermostat 2 is connected in series with the motor 1 and a control for igniting the pilot light upon the initial closing of the motor circuit and then after a sufficient time for the ignition of the mixture issuing from the nozzle at the end of the pipe 10 has elapsed to cut out the ignition device, is connected in parallel in the circuit between the lead from the thermostat to the motor and the return lead from the motor to the commercial line. This control includes also means for regulating the amount of air entering through the air intake chamber 9 and comprises a pivoted damper 16 centrally mounted within the chamber 9 which is normally held in the open position, illustrated in dotted lines on Figure 2, by the spring-pressed operating rod 17 which passes downward through a housing upon the underside of the intake chamber 9 and enters at its lower end into a thermal chamber 18 entering the interior of the gas producing chamber with the lower extremity of the rod 17 engaging the upper side of a bi-metal strip 19 secured at one end to the inner end of said chamber. The damper operating arm 20 pivoted to the operating rod extends beyond the damper and mounts a mercury tube control switch 21 having two terminals entering adjacent one end thereof and so arranged that when the damper is opened, the tube will be tilted so that the mercury closes the circuit between the two terminals. One of these terminals is in circuit with the lead from the motor to the commercial line and the other terminal is in circuit with the lead from the thermostat to the motor. Interposed in this shunt circuit between the thermostat and mercury tube switch control is a spark coil 22, one terminal of the secondary circuit of which is connected to the ignition device 11, here shown as a commercial spark plug, and the other terminal of which grounded to any part of the device, here shown as connected to the atomizing mixture pipe 10. A solenoid operated valve 23 in the gas pipe 12 is also interposed in the circuit between the thermostat and the mercury tube switch control. It is, therefore, seen that when the device is in the inoperative or cold position, the mercury tube switch control places the spark coil and solenoid valve in circuit between the thermostat and return lead from the motor to the commercial line but the circuit is broken through the thermostat. When the temperature causes the thermostat to place the motor in circuit, the spark coil will be energized to operate the ignition device and at the same time the solenoid valve will be energized to open the supply of gas to the pilot and the operation of the motor will cause the atomized mixture to issue from the nozzle at the end of the pipe 10. The atomized mixture will rise in the air and fuel conduit 8 until ignited by the gas pilot and thereafter the pressure from the nozzle will cause the flame to pass downward and impinge upon the particles of refractory material at the bottom of the gas producing chamber. Air will be drawn in through the intake chamber 9 in sufficient quantities to intermingle with the mixture issuing from the nozzle and cause combustion of sufficient intensity to heat the refractory particles to incandescence. As the temperature within the gas producing chamber 5 increases, it will be transmitted to the thermal chamber 18 causing the bi-metal strip 19 to expand and thereby from the nature of its construction, cause the outer free end to descend, which will allow the operating rod 17 in engagement therewith to descend and operate the damper to partially close the intake chamber 19, reducing the supply of air to the air and mixture conduit 8 and at the same time tilting the mercury tube control switch to break the circuit therethrough. This operation of the control switch breaks the circuit through the spark coil and solenoid operated gas valve discontinuing the supply of gas to the pilot and the operation of the ignition device and by the position of the damper at the same time increasing the richness of the mixture impinging upon the particles of refractory material 6 producing a temperature in the chamber 5 of approximately 1200° F. These particles having been heated to incandescency will act upon the rich mixture of atomized oil, steam and air passing through the interstices thereof to break up the liquid fuel so that the resultant fixed gas arising in the gas conduit 7 will be of approximately the same nature as producer gas formed in the ordinary commercial gas producer, and it has been found by analysis to comprise approximately the following percentages by volume of the following constituents: carbon dioxide, $CO_2 = 8\%$; carbon monoxide, $CO = 15\%$; hydrogen, $H_2 = 8\%$; methane and other hydrocarbon fixed gases $= 5\%$; nitrogen, $N_2 = 64\%$; total $= 100\%$.

Figure 3 illustrates an embodiment of this invention as applied to the operation of a gas engine in which the operating parts and electric circuits are similar to those illustrated and described in connection with Figures 1 and 2 with the exception that the fixed gas conduit 13 instead of discharging at a burner 14, discharges into a carburetor 24 of a gas engine 25. Figures 3a and 3b illustrate the position of the damper and mercury tube control switch when the gas engine is operating and in the inoperative position, respectively.

What I claim is:

The method of making mixed oil gas and producer gas for domestic heating purposes; comprising the simultaneously mixing of oil, air and water and delivering said mixture from an atomizing nozzle in a controlled stream of supplemental air sufficient to support partial combustion, igniting the mixture, enclosing the flame therefrom and directing it upon the upper surfaces of a plurality of spaced apart particles of refractory material upon the bottom of a chamber surrounding the flame enclosure, causing the particles of refractory material to become incandescent, automatically reducing the supplemental air by increasing the temperature within the chamber until a predetermined temperature is reached, thereby causing partial combustion and generation of lean oil gas, and leading the resultant fixed oil gas passing through the incandescent particles from said chamber about said flame enclosure.

WALTER W. WILLIAMS.